US012612047B2

(12) United States Patent
Lee et al.

(10) Patent No.: US 12,612,047 B2
(45) Date of Patent: Apr. 28, 2026

(54) METHOD AND APPARATUS FOR CONTROLLING VEHICLE

(71) Applicants:Hyundai Motor Company, Seoul (KR); Kia Corporation, Seoul (KR)

(72) Inventors: Jung Hyun Lee, Seoul (KR); Dong Hoon Koo, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 163 days.

(21) Appl. No.: 18/745,561

(22) Filed: Jun. 17, 2024

(65) Prior Publication Data

US 2025/0214591 A1 Jul. 3, 2025

(30) Foreign Application Priority Data

Dec. 27, 2023 (KR) ......................... 10-2023-0193508

(51) Int. Cl.
*B60W 40/076* (2012.01)
*G06V 20/56* (2022.01)
(52) U.S. Cl.
CPC ......... *B60W 40/076* (2013.01); *G06V 20/588* (2022.01); *B60W 2420/403* (2013.01); *B60W 2552/15* (2020.02)
(58) Field of Classification Search
CPC ........... B60W 40/076; B60W 2552/15; B60W 2420/403; G06V 20/588
USPC ........................................................... 701/1
See application file for complete search history.

(56) References Cited

U.S. PATENT DOCUMENTS

| | | | |
|---|---|---|---|
| 2015/0049913 A1* | 2/2015 | Zhong | G06T 7/593 |
| | | | 382/104 |
| 2016/0304098 A1* | 10/2016 | Ito | H04N 13/106 |
| 2017/0270372 A1* | 9/2017 | Stein | G06V 20/56 |
| 2019/0135265 A1* | 5/2019 | Shin | G01C 21/30 |

FOREIGN PATENT DOCUMENTS

DE        102022103147 A1 *  9/2022  ............. G01S 17/66

OTHER PUBLICATIONS

Sahlholm, Road grade estimation for look-ahead vehicle control using multiple measurement runs, Oct. 30, 2009, Elsevier, Control Engineering Practice 18 (Year: 2009).*
Lifeng, One estimation method of road slope and vehicle distance, Feb. 28, 2023, Elsevier, Measurement vol. 208 (Year: 2023).*

* cited by examiner

*Primary Examiner* — Matthias S Weisfeld
(74) *Attorney, Agent, or Firm* — MORGAN, LEWIS & BOCKIUS LLP

(57) ABSTRACT

A vehicle control method, includes estimating, by an estimator, a first slope inclination of a first area by photographing the first area using a first camera if a vehicle is located in an area where an inclination of a vehicle floor is the same as a slope inclination of a road surface, estimating, by the estimator, a second slope inclination of a second area by photographing the second area located farther from the vehicle than the first area using a second camera, and estimating, by the estimator, a third slope inclination of the second area by photographing the second area using the first camera if the vehicle is driven and located in the first area.

18 Claims, 10 Drawing Sheets

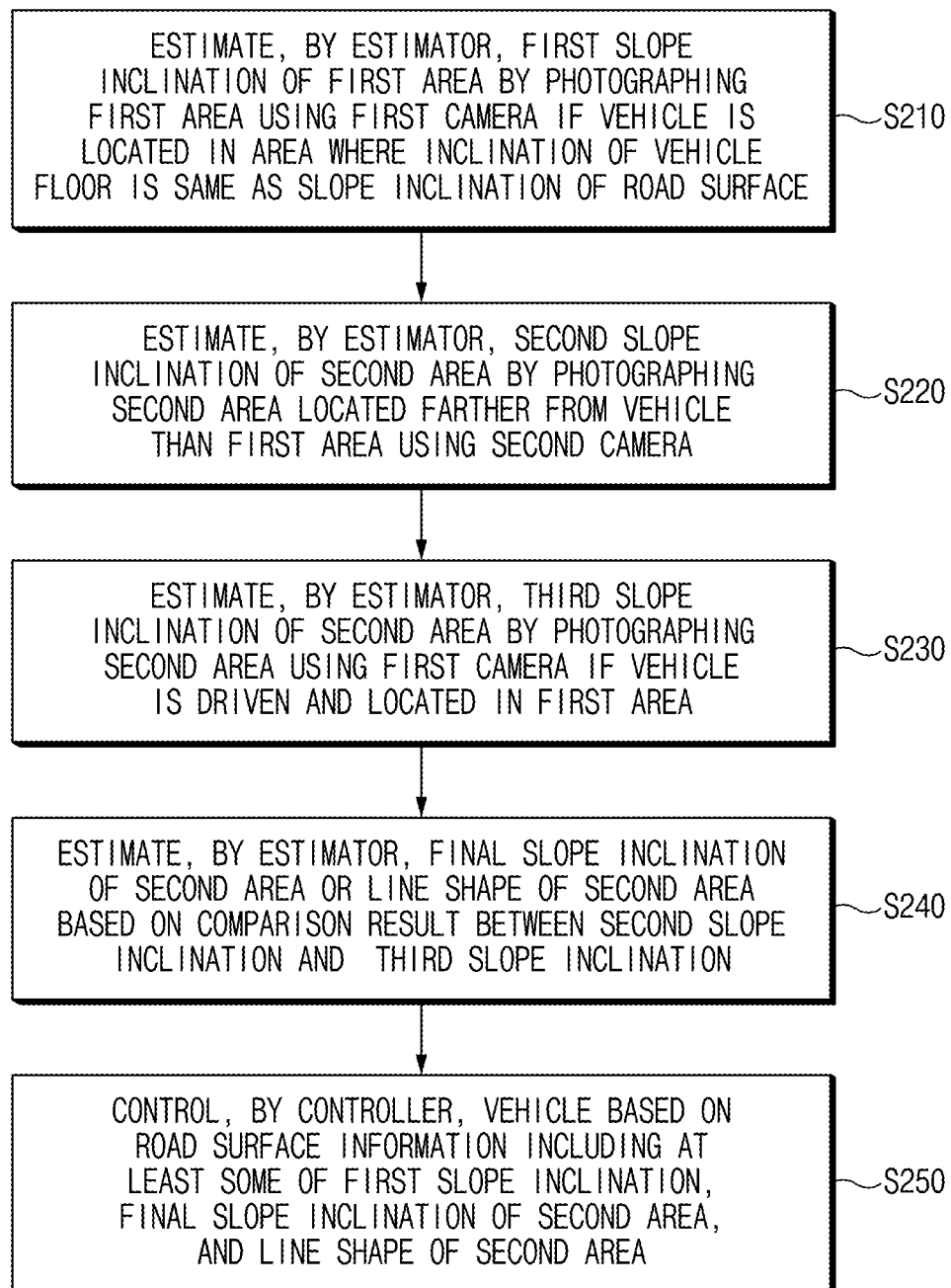

ESTIMATE, BY ESTIMATOR, FIRST SLOPE
INCLINATION OF FIRST AREA BY PHOTOGRAPHING
FIRST AREA USING FIRST CAMERA IF VEHICLE IS
LOCATED IN AREA WHERE INCLINATION OF VEHICLE
FLOOR IS SAME AS SLOPE INCLINATION OF ROAD SURFACE ~S210

ESTIMATE, BY ESTIMATOR, SECOND SLOPE
INCLINATION OF SECOND AREA BY PHOTOGRAPHING
SECOND AREA LOCATED FARTHER FROM VEHICLE
THAN FIRST AREA USING SECOND CAMERA ~S220

ESTIMATE, BY ESTIMATOR, THIRD SLOPE
INCLINATION OF SECOND AREA BY PHOTOGRAPHING
SECOND AREA USING FIRST CAMERA IF VEHICLE
IS DRIVEN AND LOCATED IN FIRST AREA ~S230

ESTIMATE, BY ESTIMATOR, FINAL SLOPE INCLINATION
OF SECOND AREA OR LINE SHAPE OF SECOND AREA
BASED ON COMPARISON RESULT BETWEEN SECOND SLOPE
INCLINATION AND THIRD SLOPE INCLINATION ~S240

CONTROL, BY CONTROLLER, VEHICLE BASED ON
ROAD SURFACE INFORMATION INCLUDING AT
LEAST SOME OF FIRST SLOPE INCLINATION,
FINAL SLOPE INCLINATION OF SECOND AREA,
AND LINE SHAPE OF SECOND AREA ~S250

DETECT, BY DETECTOR, SECOND LINE IN SECOND AREA — S221

DETECT, BY DETECTOR, SECOND
VANISHING POINT BASED ON SECOND LINE — S222

ESTIMATE, BY ESTIMATOR, SECOND VEHICLE
POSTURE BASED ON SECOND VANISHING POINT — S223

ESTIMATE, BY ESTIMATOR, SECOND SLOPE INCLINATION
BASED ON FIRST VEHICLE POSTURE, SECOND
VEHICLE POSTURE, AND FIRST SLOPE INCLINATION — S224

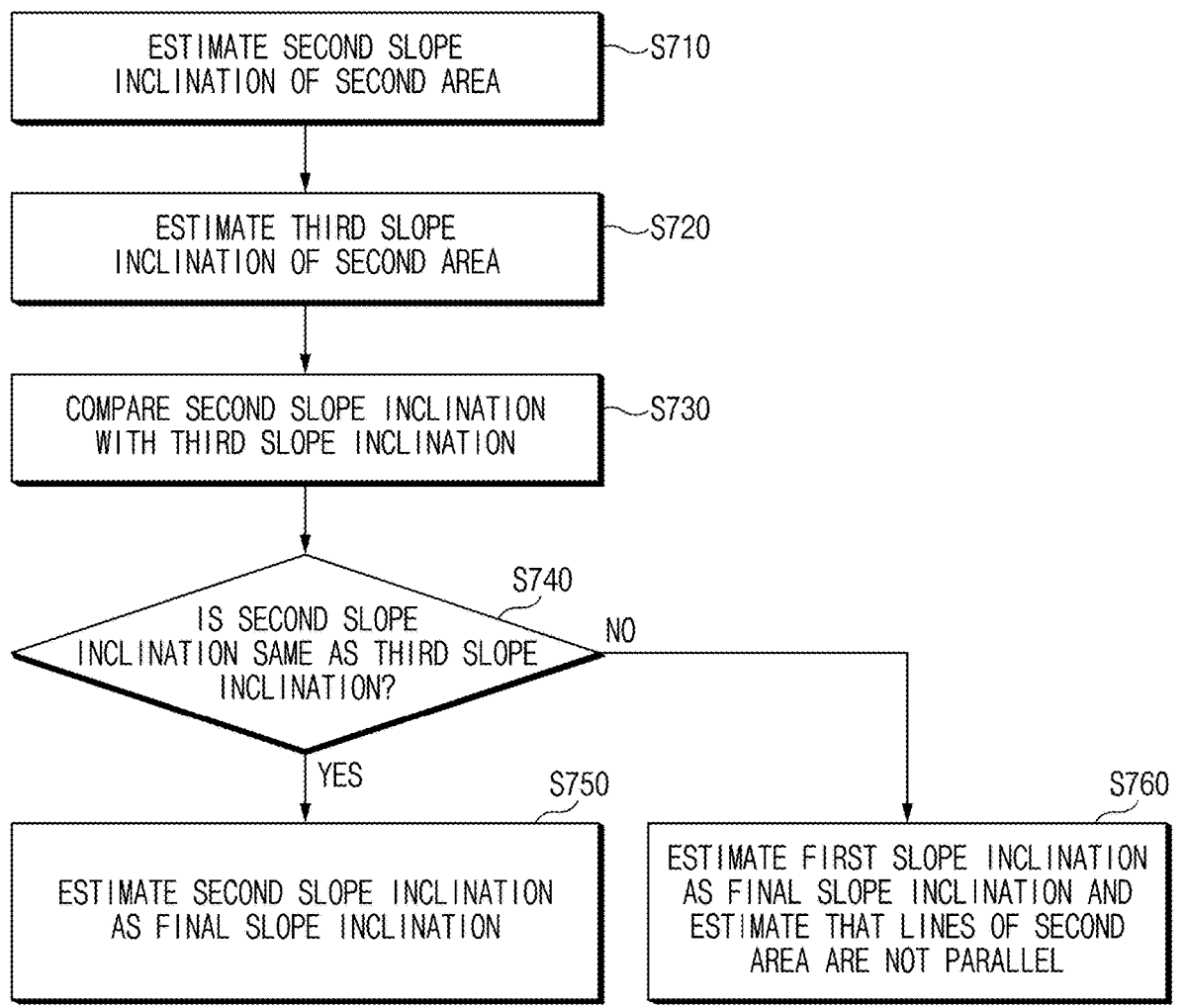

ESTIMATE SECOND SLOPE
INCLINATION OF SECOND AREA ~S710

ESTIMATE THIRD SLOPE
INCLINATION OF SECOND AREA ~S720

COMPARE SECOND SLOPE INCLINATION
WITH THIRD SLOPE INCLINATION ~S730

IS SECOND SLOPE
INCLINATION SAME AS THIRD SLOPE
INCLINATION? S740

NO

YES

S750

ESTIMATE SECOND SLOPE INCLINATION
AS FINAL SLOPE INCLINATION

S760

ESTIMATE FIRST SLOPE INCLINATION
AS FINAL SLOPE INCLINATION AND
ESTIMATE THAT LINES OF SECOND
AREA ARE NOT PARALLEL

FIG.7

METHOD AND APPARATUS FOR CONTROLLING VEHICLE

CROSS-REFERENCE TO RELATED APPLICATION

The present application claims priority to Korean Patent Application No. 10-2023-0193508, filed on Dec. 27, 2023, the entire contents of which is incorporated herein for all purposes by this reference.

BACKGROUND OF THE PRESENT DISCLOSURE

Field of the Present Disclosure

The present disclosure relates to a vehicle control method and apparatus, and more particularly, relates to a vehicle control method and apparatus using a camera.

Description of Related Art

To assist in driving a vehicle, the distance between the vehicle and an object may be measured using various sensors. For example, a vehicle may use a camera to measure the distance between the vehicle and an object. However, the accuracy of measuring the distance between a vehicle and an object may be reduced depending on a change in vehicle posture due to acceleration or deceleration of the vehicle, or a change in vehicle posture due to a bump or a slope of the road surface.

Therefore, a method of accurately measuring the distance between a vehicle and an object may be needed by referring to a posture of the vehicle, a slope inclination of a road surface, etc.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus that estimate a slope inclination of a road surface.

Various aspects of the present disclosure are directed to providing a method and apparatus that estimates a shape of a line.

Various aspects of the present disclosure are directed to providing a method and apparatus that match differences in a vehicle posture for each driving area with differences in a slope inclination of a road surface.

Various aspects of the present disclosure are directed to providing a method and apparatus that estimate a slope inclination of a road surface or a shape of a line by photographing the same area of the road surface with a plurality of cameras at different times.

Various aspects of the present disclosure are directed to providing a method and apparatus that correct geometric errors with respect to an image by a camera based on a slope inclination of a road surface.

Various aspects of the present disclosure are directed to providing a method and apparatus that measure the distance between a vehicle and an object using a camera even when the vehicle is on a slope road.

The aspects of the present disclosure to be achieved in an exemplary embodiment of the present disclosure are not limited to the aspects of the present disclosure mentioned above, another aspect of the present disclosure not mentioned will be clearly understood by those of ordinary skill in the art to which the present disclosure belongs from the following description.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control method includes estimating, by an estimator, a first slope inclination of a first area by photographing the first area using a first camera if a vehicle is located in an area where an inclination of a vehicle floor is the same as a slope inclination of a road surface, estimating, by the estimator, a second slope inclination of a second area by photographing the second area located farther from the vehicle than the first area using a second camera, estimating, by the estimator, a third slope inclination of the second area by photographing the second area using the first camera if the vehicle is driven and located in the first area, estimating, by the estimator, a final slope inclination of the second area or a line shape of the second area based on a comparison result between the second slope inclination and the third slope inclination, and controlling, by a controller, the vehicle based on road surface information including at least a part of the first slope inclination, the final slope inclination of the second area, and the line shape of the second area.

According to an exemplary embodiment of the present disclosure, the estimating of the first slope inclination of the first area may include detecting, by a detector, a first line of the first area, detecting, by the detector, a first vanishing point based on the first line, estimating, by the estimator, a first vehicle posture based on the first vanishing point, and estimating, by the estimator, the first slope inclination based on the first vehicle posture.

According to an exemplary embodiment of the present disclosure, the estimating of the first slope inclination of the first area may include estimating, by the estimator, the first slope inclination by matching a pitch angle of the first vehicle posture to the first slope inclination.

According to an exemplary embodiment of the present disclosure, the estimating of the second slope inclination of the second area may include detecting, by the detector, a second line of the second area, detecting, by the detector, a second vanishing point based on the second line, estimating, by the estimator, a second vehicle posture based on the second vanishing point, and estimating, by the estimator, the second slope inclination based on the first vehicle posture, the second vehicle posture, and the first slope inclination.

According to an exemplary embodiment of the present disclosure, the estimating of the second slope inclination of the second area may include estimating, by the estimator, the second slope inclination by matching a difference between a pitch angle of the first vehicle posture and a pitch angle of the second vehicle posture to a difference between the first slope inclination and the second slope inclination.

According to an exemplary embodiment of the present disclosure, the estimating of the final slope inclination of the second area or the line shape of the second area may include estimating, by the estimator, the second slope inclination as the final slope inclination if the second slope inclination is the same as the third slope inclination, and estimating, by the estimator, the first slope inclination as the final slope inclination if the second slope inclination is different from the third slope inclination.

According to an exemplary embodiment of the present disclosure, the estimating of the final slope inclination of the second area or the line shape of the second area may further include estimating, by the estimator, that lines in the second area are not in parallel to each other when the second slope inclination is different from the third slope inclination.

According to an exemplary embodiment of the present disclosure, the estimating of the final slope inclination of the second area or the line shape of the second area may further include estimating, by the estimator, a degree of widening of the line in the second area based on a difference between the second slope inclination and the third slope inclination.

According to an exemplary embodiment of the present disclosure, the controlling of the vehicle may include controlling, by the controller, the vehicle by correcting geometric errors with respect to images from the first camera or the second camera based on the road surface information.

According to an aspect of the present disclosure, a vehicle control apparatus includes a first camera, a second camera, an estimator that estimates a first slope inclination of a first area by photographing the first area using a first camera if a vehicle is located in an area where an inclination of a vehicle floor is the same as a slope inclination of a road surface, estimates a second slope inclination of a second area by photographing the second area located farther from the vehicle than the first area using a second camera, estimates a third slope inclination of the second area by photographing the second area using the first camera if the vehicle is driven and located in the first area, and estimates a final slope inclination of the second area or a line shape of the second area based on a comparison result between the second slope inclination and the third slope inclination, and controller that is configured to control the vehicle based on road surface information including at least a part of the first slope inclination, the final slope inclination of the second area, and the line shape of the second area, through a controller.

According to an exemplary embodiment of the present disclosure, the vehicle control apparatus may further include a detector which is configured to detect a first line of the first area and a first vanishing point based on the first line, and the estimator that estimates a first vehicle posture based on the first vanishing point and the first slope inclination based on the first vehicle posture.

According to an exemplary embodiment of the present disclosure, the estimator may estimate the first slope inclination by matching a pitch angle of the first vehicle posture to the first slope inclination.

According to an exemplary embodiment of the present disclosure, the detector may detect a second line of the second area and a second vanishing point based on the second line, and the estimator may estimate a second vehicle posture based on the second vanishing point, and the second slope inclination based on the first vehicle posture, the second vehicle posture, and the first slope inclination.

According to an exemplary embodiment of the present disclosure, the estimator may estimate the second slope inclination by matching a difference between a pitch angle of the first vehicle posture and a pitch angle of the second vehicle posture to a difference between the first slope inclination and the second slope inclination.

According to an exemplary embodiment of the present disclosure, the estimator may estimate the second slope inclination as the final slope inclination if the second slope inclination is the same as the third slope inclination, and may estimate the first slope inclination as the final slope inclination if the second slope inclination is different from the third slope inclination.

According to an exemplary embodiment of the present disclosure, the estimator may estimate that lines in the second area are not in parallel to each other if the second slope inclination is different from the third slope inclination.

According to an exemplary embodiment of the present disclosure, the estimator may estimate a degree of widening of the line in the second area based on a difference between the second slope inclination and the third slope inclination.

According to an exemplary embodiment of the present disclosure, the controller may be configured for controlling the vehicle by correcting geometric errors with respect to images from the first camera or the second camera based on the road surface information, through the controller.

The features briefly summarized above with respect to the present disclosure are merely example aspects of the detailed description of the present disclosure described below, and do not limit the scope of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a flowchart for describing a vehicle control method, according to an exemplary embodiment of the present disclosure;

FIG. 7 is a flowchart for describing a vehicle control method, according to an exemplary embodiment of the present disclosure;

Figure 1:
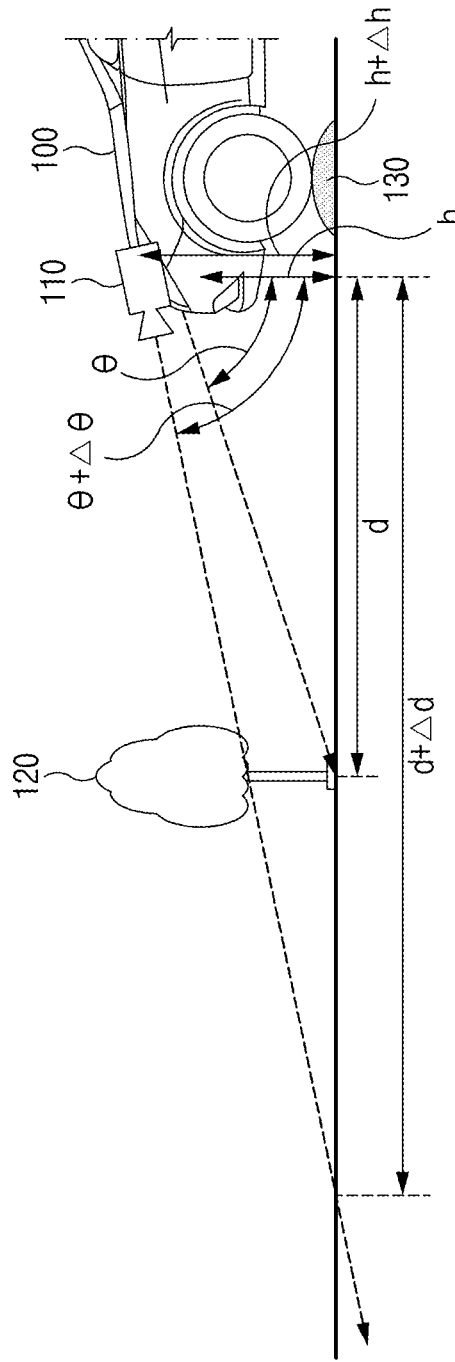
FIG. 1 is a diagram for describing a geometry by a camera.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the appended drawings so that those skilled in the art may easily carry out the present disclosure. However, the present disclosure may be implemented in many different forms and should not be construed as limited to the exemplary embodiments set forth herein.

In describing embodiments of the present disclosure, if it is determined that detailed descriptions of known configurations or functions may obscure the gist of the present disclosure, detailed descriptions thereof will be omitted to avoid redundancy. Furthermore, in the drawings, parts that are not related to the description of the present disclosure are omitted, and similar parts are provided similar reference numerals.

In an exemplary embodiment of the present disclosure, when a component is said to be "connected," "coupled," or "combined" to another component, this may include not only a direct connection relationship, but also an indirect connection relationship in which another component exists in between. Furthermore, when a component is said to "comprise" or "include" another component, this does not mean excluding the other component, but may further include another component, unless stated to the contrary.

In an exemplary embodiment of the present disclosure, terms such as first and second are used only for distinguishing one component from other components, and do not limit the order or importance of the components unless specifically mentioned. Accordingly, within the scope of the present disclosure, a first component in various exemplary embodiments of the present disclosure may be referred to as a second component in another embodiment, and likewise, the second component in various exemplary embodiments of the present disclosure may be referred to as a first component in another embodiment.

In an exemplary embodiment of the present disclosure, distinct components are only for clearly describing each feature, and do not necessarily mean that the components are separated. That is, a plurality of components may be integrated to form one hardware or software units, or one component may be distributed to form a plurality of hardware or software units. Accordingly, even if not specifically mentioned, such integrated or distributed embodiments are also included in the scope of the present disclosure.

In an exemplary embodiment of the present disclosure, components described In various embodiments do not necessarily mean essential components, and some may be optional components. Accordingly, various exemplary embodiments including a subset of the components described in an exemplary embodiment are also included in the scope of the present disclosure. Furthermore, various exemplary embodiments that include other components in addition to the components described in the various exemplary embodiments of the present disclosure are also included in the scope of the present disclosure.

In an exemplary embodiment of the present disclosure, expressions of positional relationships used in the specification, such as top, bottom, left, right, etc., are described for convenience of description, and when the drawings illustrated in the specification are viewed in reverse, the positional relationships described in the specification may be interpreted in the opposite way.

As used herein, each of such phrases as "A or B," "at least one of A and B," "at least one of A or B," "A, B, or C," "at least one of A, B, and C," and "at least one of A, B, or C," may include any one of, or all possible combinations of the items listed together with the corresponding phrase.

Hereinafter, various embodiments of the present disclosure will be described in detail with reference to FIG. 1, FIG. 2, FIG. 3, FIG. 4, FIG. 5, FIG. 6, FIG. 7, FIG. 8 and FIG. 9.

FIG. 1 is a diagram for describing a geometry by a camera.

Referring to FIG. 1, a vehicle 100 may measure the distance between the vehicle 100 and a tree 120 using a camera 110. For example, unlike FIG. 1, if the vehicle 100 is on a road surface with a slope inclination of '0', a photographing angle of the camera 110 may be '0'. Therefore, if the height of the camera 110 from the ground is 'h', a distance 'd' between the tree 120 and the vehicle 100 may be determined as h*tan θ. However, the vehicle 100 may pass over a bump 130 as illustrated in FIG. 1, and accordingly, the photographing angle of the camera 110 may be θ+Δθ. Furthermore, the height from the ground to the camera 110 may be h+Δh due to the bump 130, and accordingly, the camera 110 may perceive the distance between the vehicle 100 and the tree 120 as d+Δd. In detail, an error may occur in which the vehicle 100 perceives the distance between the vehicle 100 and the tree 120 as d+Δd, which is a longer distance than the actual distance 'd'. Therefore, to reduce these errors, a method of correcting the geometric error of the image by the camera 110 by considering the slope inclination of the road surface may be needed. The vehicle control method and apparatus according to an exemplary embodiment of the present disclosure estimate the slope inclination of the road surface and correct the geometric error of the image by the camera based on the slope inclination of the road surface, accurately measuring the distance between a vehicle and an object.

Figure 3A:
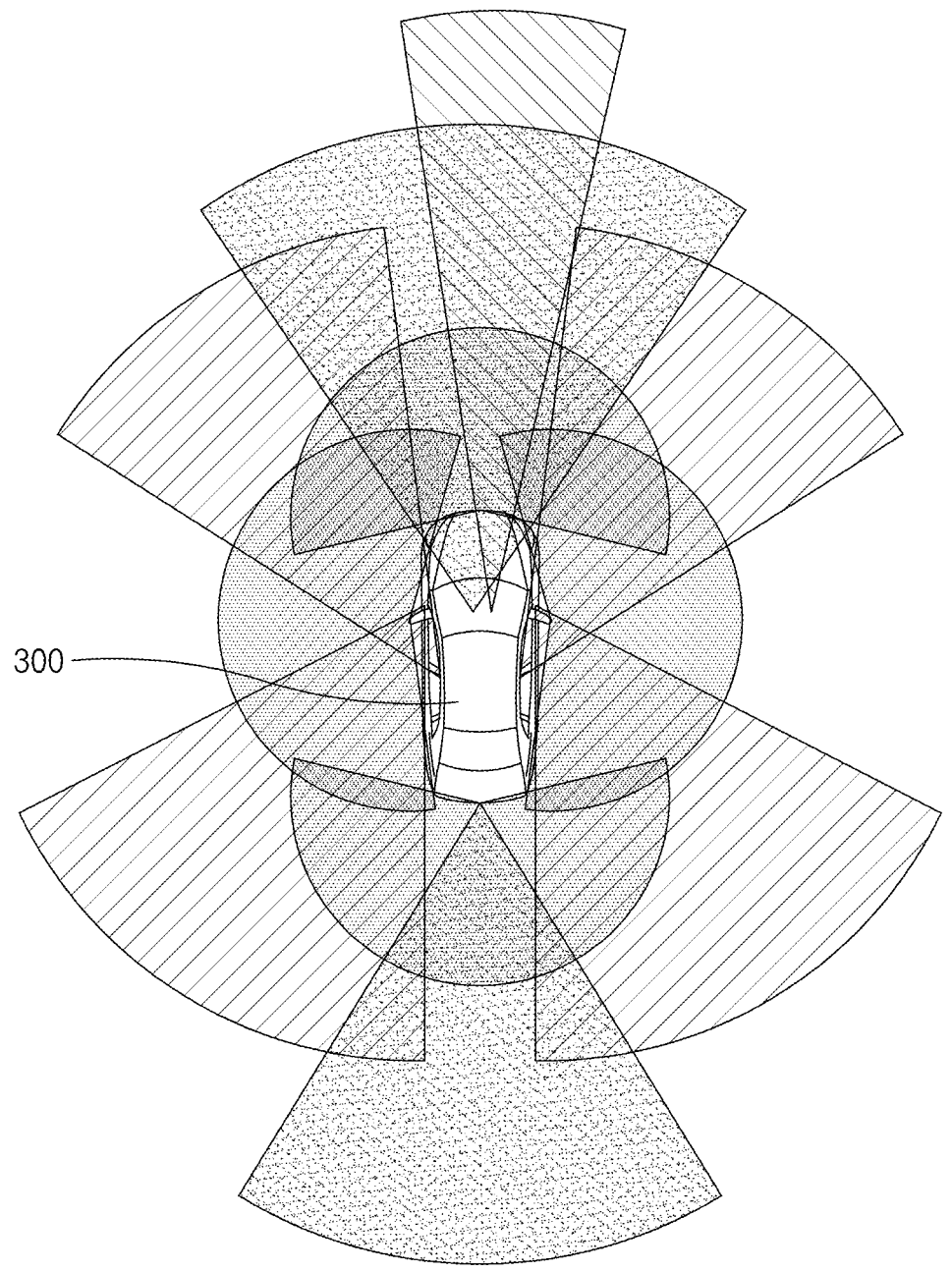
FIG. 3A is a diagram for describing a photographing area of a camera, according to an exemplary embodiment of the present disclosure.
Figure 3B:
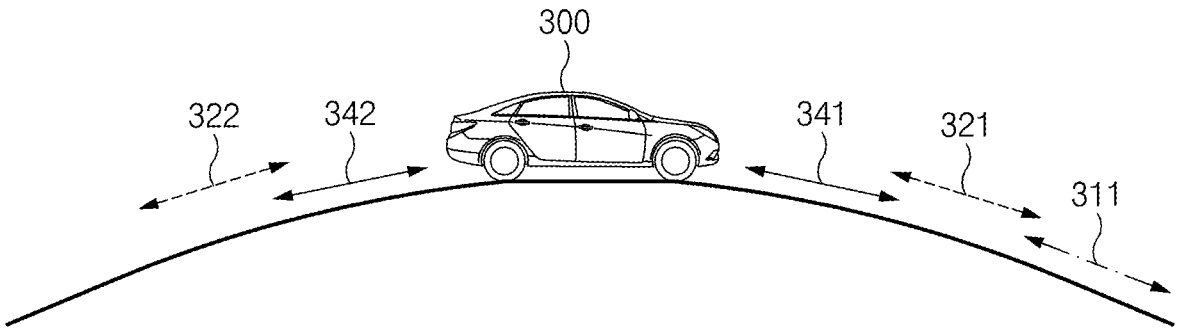
FIG. 3B is a diagram for describing a photographing area of a camera, according to an exemplary embodiment of the present disclosure.

FIG. 2 is a flowchart for describing a vehicle control method, according to an exemplary embodiment of the present disclosure. FIG. 3A is a diagram for describing a photographing area of a camera, according to an exemplary embodiment of the present disclosure. FIG. 3B is a diagram for describing a photographing area of a camera, according to an exemplary embodiment of the present disclosure. Hereinafter, FIG. 2 will be described with reference to FIGS. 3A and 3B.

Referring to FIG. 2, according to the vehicle control method according to an exemplary embodiment of the present disclosure, in S210, an estimator, if the vehicle is located in an area where an inclination of a vehicle floor is the same as a slope inclination of a road surface, may estimate a first slope inclination of a first area by photographing the first area using a first camera. The first area may be a front near area relative to the vehicle, and the first camera may be a camera that photographs the front near area. For example, referring to FIG. 3A, a vehicle 300 may include a short-range camera for photographing a short-distance area 340, a mid-range camera for photographing a mid-distance area 320, a far-distance camera for photographing a far-distance area 310, and a lateral camera for photographing a lateral area 330. The front of the short-distance area 340 may be referred to as a first area, the rear of the short-distance area 340 may be referred to as a fourth area, the front of the mid-distance area 320 may be referred to as a second area, the rear of the mid-distance area 320 may be referred to as a fifth area, and the far-distance area may be referred to as a third area. The short-range camera may include a short-distance front camera that photographs the front of the short-distance area 340 based on the vehicle 300, a short-distance rear camera that photographs the rear of the short-distance area 340, and a short-distance lateral camera that photographs the side of the short-distance area 340, and the short-distance front camera may be referred to as a first camera and the short-distance rear camera may be referred to as a fourth camera. Furthermore, the mid-range camera may photograph the mid-distance area 320 located further than the short-distance area 340 based on the vehicle 300, and may include a mid-distance front camera and a mid-distance rear camera. In the instant case, the mid-distance front camera may be referred to as a second camera, and the mid-distance rear camera may be referred to as a fifth camera. Additionally, the far-distance camera may photograph the far-distance area 310 located further than the mid-distance area 320 based on the vehicle 300, and may be referred to as a third camera.

The vehicle control method according to an exemplary embodiment of the present disclosure may estimate the slope inclination of the road surface by estimating a vehicle posture. For example, the vehicle control method may estimate the slope inclination of the road surface by estimating the vehicle posture using LI-VDC (Lane Inference-based Vehicle Dynamic Compensation) logic. The LI-VDC logic may be a logic that estimates the vehicle posture by detecting a vanishing point based on the line and estimating a pitch angle of the vehicle based on the vanishing point if the slope inclination of the road surface is uniform. The LI-VDC logic, which is the logic for estimating the vehicle posture, may estimate the vehicle posture in the area around the vehicle 300 under the assumption that the vehicle 300 is located in an area where the slope of the vehicle floor and the slope inclination of the road surface are the same. More specific details regarding the LI-VDC logic will be described later.

Referring to FIG. 3B, as described above, the vehicle 300 may be located in an area where the slope of the vehicle floor and the slope inclination of the road surface are the same, and road surfaces in the short-distance area (i.e., the first area 341 or area 342), which is a relatively close area to the vehicle 300 may include a slope inclination. Furthermore, road surfaces of the mid-distance area 320 (i.e., the second area 321 or area 322) located farther from the vehicle 300 than the road surfaces of the short-distance area 340 may also include a slope inclination. Furthermore, a road surface 311 in the far-distance area 310 located farther from the vehicle 300 than the road surface in the mid-distance area 320 may also include a slope inclination.

The vehicle control method may estimate the first slope inclination of the first area 341 by photographing the first area 341 using a first camera. In detail, the vehicle control method may estimate the first slope inclination of the front (i.e., the first area 341) of the short-distance area 340 by photographing the front of the short-distance area 340 with the short-distance front camera (the first camera). For example, the vehicle control method may estimate the vehicle posture in the first area by photographing the first area 341 using the first camera, and may estimate the first slope inclination in the first area 341 by matching the vehicle posture to the slope inclination of the road surface. More specific details on estimating the first slope inclination will be described later.

According to the vehicle control method, in S220, the estimator may estimate a second slope inclination of the second area 321 by photographing the second area 321 located farther from the vehicle than the first area 341 using the second camera. In detail, the vehicle control method may estimate the second slope inclination of the front 321 of the mid-distance area 320 by photographing the front 321 of the mid-distance area 320 using a mid-distance front camera (the second camera). For example, the vehicle control method may estimate the vehicle posture in the second area 321 by photographing the second area 321 using the second camera, and may estimate the second slope inclination of the second area 321 by matching a difference between the vehicle posture in the first area 341 and the vehicle posture in the second area 321 to a difference between the slope inclination of the first area 341 and the slope inclination of the second area 321. More specific details on estimating the second slope inclination will be described later.

According to the vehicle control method, in S230, if the vehicle 300 is driven and located in the first area 341, the estimator may estimate a third slope inclination of the second area 321 by photographing the second area 321 using the first camera. In detail, if the vehicle 300 is traveling forward, the vehicle in an area where the vehicle floor and the road surface include the same slope inclination, after a predetermined time period, may be located in the first area 341, which is the front area of the short-distance area 340. The vehicle 300 located in the first area 341 may photograph the second area 321, which is a part of the existing mid-distance area using the first camera that photographs the front of the short-distance area 340. For the present reason, the vehicle control method may estimate the third slope inclination of the second area 321 by photographing the second area 321 using the first camera. In detail, the vehicle 300 may estimate the second slope inclination of the second area 321 by photographing the second area 321 using the second camera if t=0, and may estimate the third slope inclination of the second area 321 by photographing the second area 321 using the first camera if t=1. More specific details of estimating the second slope inclination by photographing the second area 321 with the first camera or the second camera depending on changes in time will be described later.

According to the vehicle control method, in S240, the estimator may estimate the final slope inclination of the second area 321 or the line shape of the second area 321 based on the comparison result between the second slope inclination and the third slope inclination. For example, because the second slope inclination and the third slope inclination each correspond to an estimated value of the slope inclination of the second area, which is the same area, the second slope inclination may be the same as the third slope inclination. If the second slope inclination and the third slope inclination are the same, the final slope inclination of the second area 321 may be estimated as the second slope inclination. If the second slope inclination is different from the third slope inclination, estimation values of the slope inclination in the second area, which is the same area, are derived differently, so there may be a cause for the error between the second slope inclination and the third slope inclination. For example, the LI-VDC logic is logic that estimates the vehicle posture if the lines are parallel, so if estimating the slope inclination using the LI-VDC logic, it may be necessary to assume that the lines are parallel. Therefore, if the slope inclination values estimated for the same area are different from each other, it may be estimated that the error occurs because the lines in the corresponding area are not parallel. Therefore, if there is an error between the second slope inclination and the third slope inclination, it may be estimated that the lines in the second area are not parallel. For example, the degree of widening of the line in the second area may be estimated based on a difference between the second slope inclination and the third slope inclination. Additionally, if the second slope inclination and the third slope inclination are different from each other, the slope inclination of the second area 321 may be estimated to be the same as the first slope inclination.

Depending on the vehicle control method, in S250, a controller may be configured for controlling the vehicle based on road surface information including at least some of the first slope inclination, the final slope inclination of the second area, and the line shape of the second area. In detail, the vehicle control method may be configured for controlling the vehicle 300 by correcting geometric errors in images from cameras included in the vehicle 300 based on the road surface information. For example, as described in FIG. 1, an error may occur if the distance between the vehicle 300 and an object is measured due to reasons such as the vehicle 300 being on an incline road. The vehicle control method may correct a camera angle if measuring the distance between the vehicle 300 and the object by estimating the slope inclination of the road surface and considering the slope inclination if measuring the distance between the vehicle 300 and the object. Therefore, the distance between the vehicle 300 and the object may be accurately measured.

Figure 4:
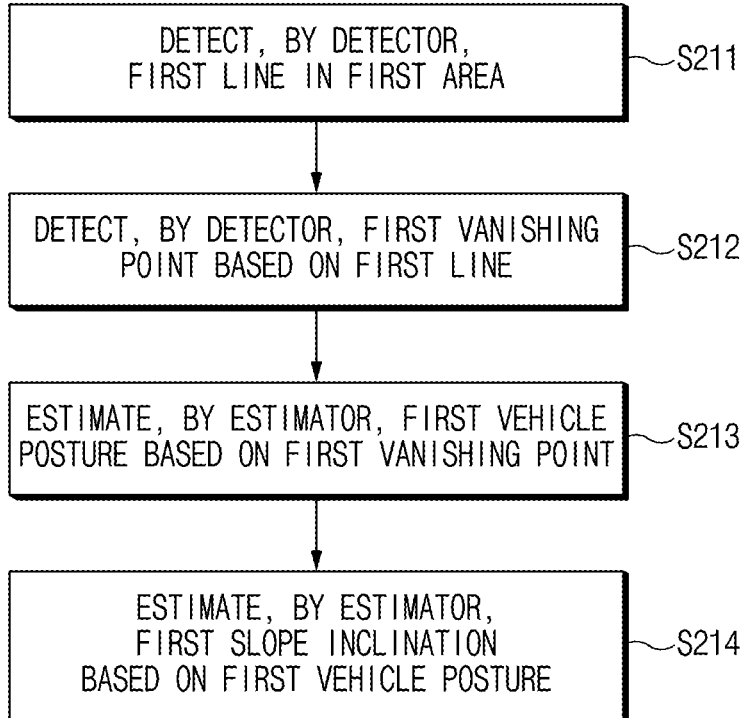
FIG. 4 is a flowchart for describing a vehicle control method, according to an exemplary embodiment of the present disclosure.

FIG. 4 is a flowchart for describing a vehicle control method, according to an exemplary embodiment of the present disclosure. The flowchart of FIG. 4 is a flowchart of a more detailed method of S210 of FIG. 1.

Referring to FIG. 4, according to the vehicle control method according to an exemplary embodiment of the present disclosure, in S211, the detector may detect the first line in the first area. For example, the vehicle control method may detect the line in the first area to estimate the posture of the vehicle using the LI-VDC logic.

Furthermore, according to the vehicle control method, in S212, the detector may detect the first vanishing point based on the first line.

Additionally, according to the vehicle control method, in S213, the estimator may estimate a first vehicle posture based on the first vanishing point. For example, the vehicle control method may determine the pitch angle of the camera based on coordinates of the first vanishing point. Additionally, the vehicle control method may estimate the pitch angle of the vehicle, that is, the first vehicle posture, by converting the domain for the pitch angle of the camera from the camera to the vehicle.

Additionally, according to the vehicle control method, in S214, the estimator may estimate the first slope inclination based on the first vehicle posture. For example, by the LI-VDC logic, the estimated first vehicle posture may be the vehicle posture in the first area if the slope inclination of the first area is the same as the slope inclination of an area (an area where the vehicle floor and the slope inclination of the road surface are the same) where the vehicle is initially located. In the instant case, by assuming that the pitch angle of the first vehicle posture is the angle generated by the first slope inclination of the first area, the first slope inclination may be estimated by matching the pitch angle of the first vehicle posture to the first slope inclination.

Figure 5:
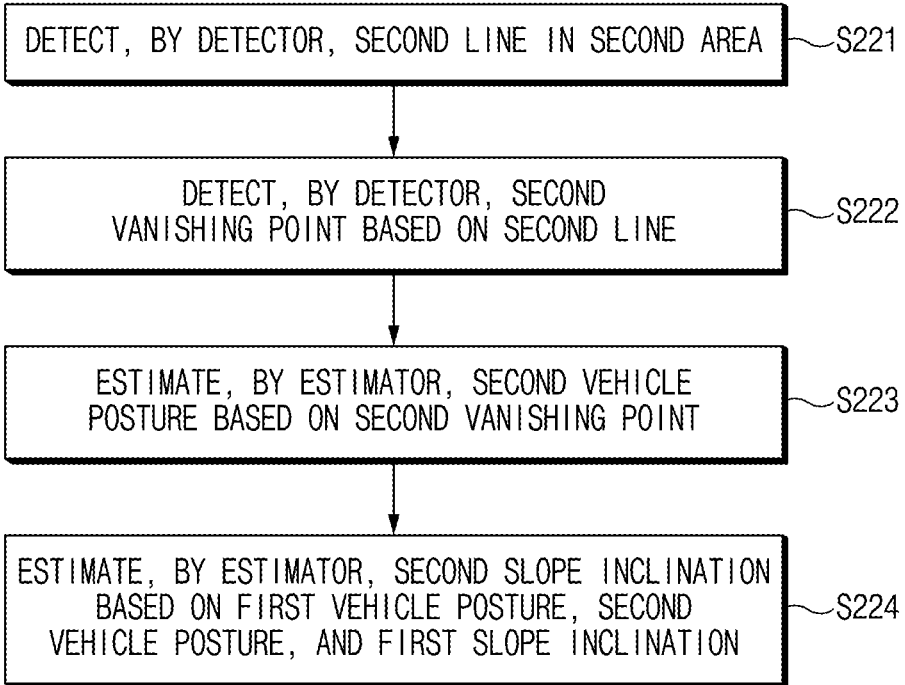
FIG. 5 is a flowchart for describing a vehicle control method, according to an exemplary embodiment of the present disclosure.

FIG. 5 is a flowchart for describing a vehicle control method, according to an exemplary embodiment of the present disclosure. The flowchart of FIG. 5 is a flowchart of a more detailed method of S220 of FIG. 1.

Referring to FIG. 5, according to the vehicle control method according to an exemplary embodiment of the present disclosure, in S221, the detector may detect the second line in the second area. For example, the vehicle control method may detect the line in the second area to estimate the posture of the vehicle using the LI-VDC logic.

Furthermore, according to the vehicle control method, in S222, the detector may detect a second vanishing point based on the second line.

Additionally, according to the vehicle control method, in S223, the estimator may estimate the second vehicle posture based on the second vanishing point. For example, the vehicle control method may determine the pitch angle of the camera based on the coordinates of the second vanishing point. Additionally, the vehicle control method may estimate the pitch angle of the vehicle in the second area, that is, the second vehicle posture, by converting the domain for the pitch angle of the camera from the camera to the vehicle.

Furthermore, according to the vehicle control method, in S224, the estimator may estimate the second slope inclination based on the first vehicle posture, the second vehicle posture, and the first slope inclination. For example, the second slope inclination may be estimated by matching a difference between the pitch angle of the first vehicle posture and the pitch angle of the second vehicle posture to a difference between the first slope inclination and the second slope inclination.

Figure 6:
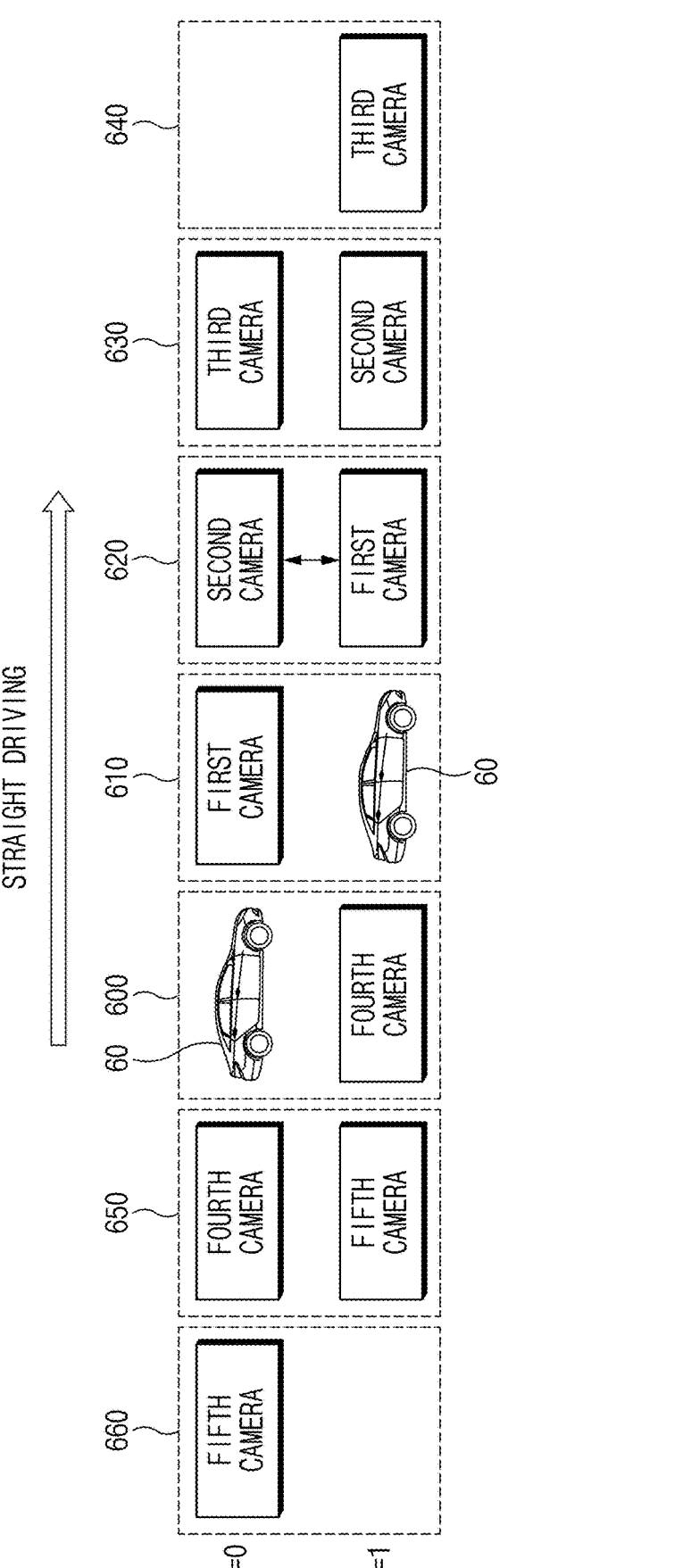
FIG. 6 is a flowchart for describing a vehicle control method, according to an exemplary embodiment of the present disclosure.

FIG. 6 is a flowchart for describing a vehicle control method, according to an exemplary embodiment of the present disclosure.

A vehicle 60 according to an exemplary embodiment of the present disclosure may include a first camera, a second camera, a third camera, a fourth camera, and a fifth camera.

At time t=0, the vehicle 60 may be located in an area 600 where the inclination of the vehicle floor and the slope inclination of the road surface are the same.

Furthermore, the vehicle 60 may photograph a first area 610, which is a front short-distance area, with the first camera, may photograph a second area 620, which is a front mid-distance area, with a second camera, and may photograph a third area 630, which is a front far-distance area, with a third camera. Additionally, the vehicle 60 may photograph a fourth area 650, which is a rear short-distance area, with the fourth camera, and may photograph a fifth area 660, which is a rear mid-distance area, with the fifth camera.

The vehicle 60 may estimate the first slope inclination, which is the slope inclination of the first area 610, by photographing the first area 610 with the first camera at the time t=0. For example, the first line in the first area 610 may be detected, the first vanishing point may be detected based on the first line, the first vehicle posture may be estimated based on the first vanishing point, and the first slope inclination of the first area 610 may be estimated based on the first vehicle posture.

Furthermore, the vehicle 60 may estimate the second slope inclination, which is the slope inclination of the second area 620, by photographing the second area 620 with the second camera at the time t=0. For example, the second line in the second area 620 may be detected, the second vanishing point may be detected based on the second line, the second vehicle posture may be estimated based on the second vanishing point, and the second slope inclination may be estimated based on the first vehicle posture, the second vehicle posture, and the first slope inclination.

If t=1, a predetermined time period is passed since t=0, the vehicle 60 may drive straight and be located in the first area 610.

Accordingly, the vehicle 60 may photograph the second area 620 with the first camera, the third area 630 with the second camera, and a sixth area 640 with the third camera. Furthermore, the vehicle 60 may photograph the area 600 where the inclination of the vehicle floor and the slope inclination of the road surface are the same with the fourth camera, and may photograph the fourth area 650 with the fifth camera.

The vehicle 60 may estimate the third slope inclination of the second area 620 by photographing the second area 620 with the first camera at the time t=1.

Even if the slope inclinations are estimated by photographing with different cameras (the first camera and the second camera), the second slope inclination and the third slope inclination may be the same since both the slope inclinations are with respect to the second area 620. If the second slope inclination and the third slope inclination are the same, the second slope inclination may be referred to as the final slope inclination of the second area 620.

However, if the second slope inclination and the third slope inclination are not the same, the slope inclination estimation values in the second area 620 are derived differently, so a cause for the error between the second slope inclination and the third slope inclination may exist. For example, if estimating the slope inclination using the LI-VDC logic, it may be necessary to assume that the lines are parallel. Therefore, if the slope inclination values estimated for the same area are different from each other, it may be estimated that the error occurs because the lines in the corresponding area are not parallel. Accordingly, if there is an error between the second slope inclination and the third slope inclination, it may be estimated that the second lines in the second area 620 are not parallel. In detail, the degree of widening of the second line in the second area 620 may be estimated based on the difference between the second slope inclination and the third slope inclination. Furthermore, if the second slope inclination is different from the third slope inclination, the final slope inclination of the second area may be estimated to be the same as the slope inclination of the first area.

FIG. 7 is a flowchart for describing a vehicle control method, according to an exemplary embodiment of the present disclosure.

The vehicle control method according to an exemplary embodiment of the present disclosure may estimate the second slope inclination of the second area in S710. In detail, the vehicle control method may estimate the second slope inclination of the second area by photographing (at time t=0) the second area located farther from the vehicle than the first area using the second camera.

The vehicle control method may estimate the third slope inclination of the second area in S720. In detail, if the vehicle is driven and located in the first area (t=1), the third slope inclination of the second area may be estimated by photographing the second area using the first camera.

The vehicle control method, in S730, may compare the second slope inclination with the third slope inclination.

The vehicle control method, in S740, may determine whether the second slope inclination is the same as the third slope inclination.

The vehicle control method, in S750, may estimate the second slope inclination as the final slope inclination of the second area if the second slope inclination is the same as the third slope inclination.

In S760, the vehicle control method may estimate the first slope inclination as the final slope inclination of the second area if the second slope inclination is different from the third slope inclination, and may estimate that the lines of the second area are not parallel. For example, if the second slope inclination is different from the third slope inclination, estimation values of the slope inclination in the second area, which is the same area, are derived differently, so there may be a cause for the error between the second slope inclination and the third slope inclination. For example, the LI-VDC logic is logic that estimates the vehicle posture if the lines are parallel, so if estimating the slope inclination using the LI-VDC logic, it may be necessary to assume that the lines are parallel. Therefore, if the slope inclination values estimated for the same area are different from each other, it may be estimated that the error occurs because the lines in the corresponding area are not parallel. Therefore, if there is an error between the second slope inclination and the third slope inclination, it may be estimated that the lines in the second area are not parallel. The degree of widening of the line in the second area may be estimated based on the difference between the second slope inclination and the third slope inclination. Furthermore, if the second slope inclination and the third slope inclination are different from each other, the slope inclination of the second area may be estimated to be the same as the first slope inclination.

Figure 8:
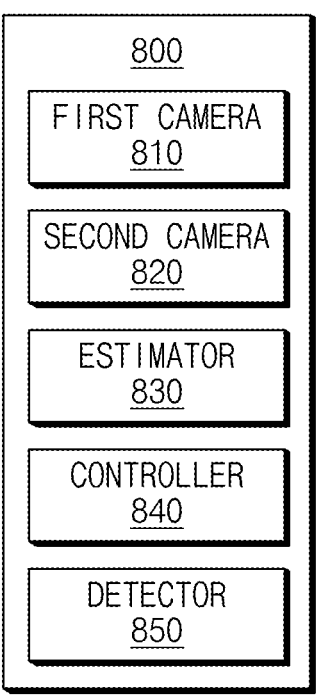
FIG. 8 is block diagram illustrating a vehicle control apparatus, according to an exemplary embodiment of the present disclosure.

FIG. 8 is block diagram illustrating a vehicle control apparatus, according to an exemplary embodiment of the present disclosure.

The vehicle control apparatus 800 according to an exemplary embodiment of the present disclosure may include a first camera 810, a second camera 820, an estimator 830, a controller 840, and a detector 850. Although not illustrated in FIG. 8, the vehicle control apparatus 800 includes a memory configured to store computer-executable instructions and at least one processor configured to access the memory and execute the instructions. The estimator 830, the controller 840, and the detector 850 may correspond to or be included in at least one processor.

The estimator 830 may be configured for estimating the first slope inclination of the first area by photographing the first area using the first camera 810 if the vehicle is located in an area where the inclination of the vehicle floor is the same as the slope inclination of the road surface, to estimate the second slope inclination of the second area located farther from the vehicle than the first area by photographing the second area using the second camera 820, to estimate the third slope inclination of the second area by photographing the second area using the first camera 810 if the vehicle is driven and located in the first area, and to estimate the final slope inclination the second area or the line shape of the second area based on the comparison result of the second slope inclination and the third slope inclination. In detail, the estimator 830 may be configured for estimating the second slope inclination as the final slope inclination when the second slope inclination is the same as the third slope inclination, and to estimate the first slope inclination as the final slope inclination if the second slope inclination is different from the third slope inclination. Furthermore, the estimator 830 may be configured for estimating that the lines in the second area are not in parallel to each other if the second slope inclination is different from the third slope inclination. For example, the estimator 830 may be configured for estimating the degree of widening of the second line based on the difference between the second slope inclination and the third slope inclination.

The controller 840 may be configured to control the vehicle based on road surface information including at least part of the first slope inclination, the final slope inclination of the second area, and the line shape of the second area. For example, the controller 840 may be configured to control the vehicle by correcting geometric errors in images from the first camera 810 and the second camera 820 based on the road surface information.

The detector 850 may be configured to detect the first line in the first area and to detect the first vanishing point based on the first line.

Furthermore, the detector 850 may be configured to detect the second line in the second area and to detect the second vanishing point based on the second line.

The estimator 830 may be configured for estimating the first vehicle posture based on the first vanishing point and to estimate the first slope inclination based on the first vehicle posture. In detail, the estimator 830 may be configured for estimating the first slope inclination by matching the pitch angle of the first vehicle posture to the first slope inclination.

The estimator 830 may be configured for estimating the second vehicle posture based on the second vanishing point and to estimate the second slope inclination based on the first vehicle posture, the second vehicle posture, and the first slope inclination. In detail, the estimator 830 may be configured for estimating the second slope inclination by matching the difference between the pitch angle of the first vehicle posture and the pitch angle of the second vehicle posture to the difference between the first slope inclination and the second slope inclination.

Figure 9:
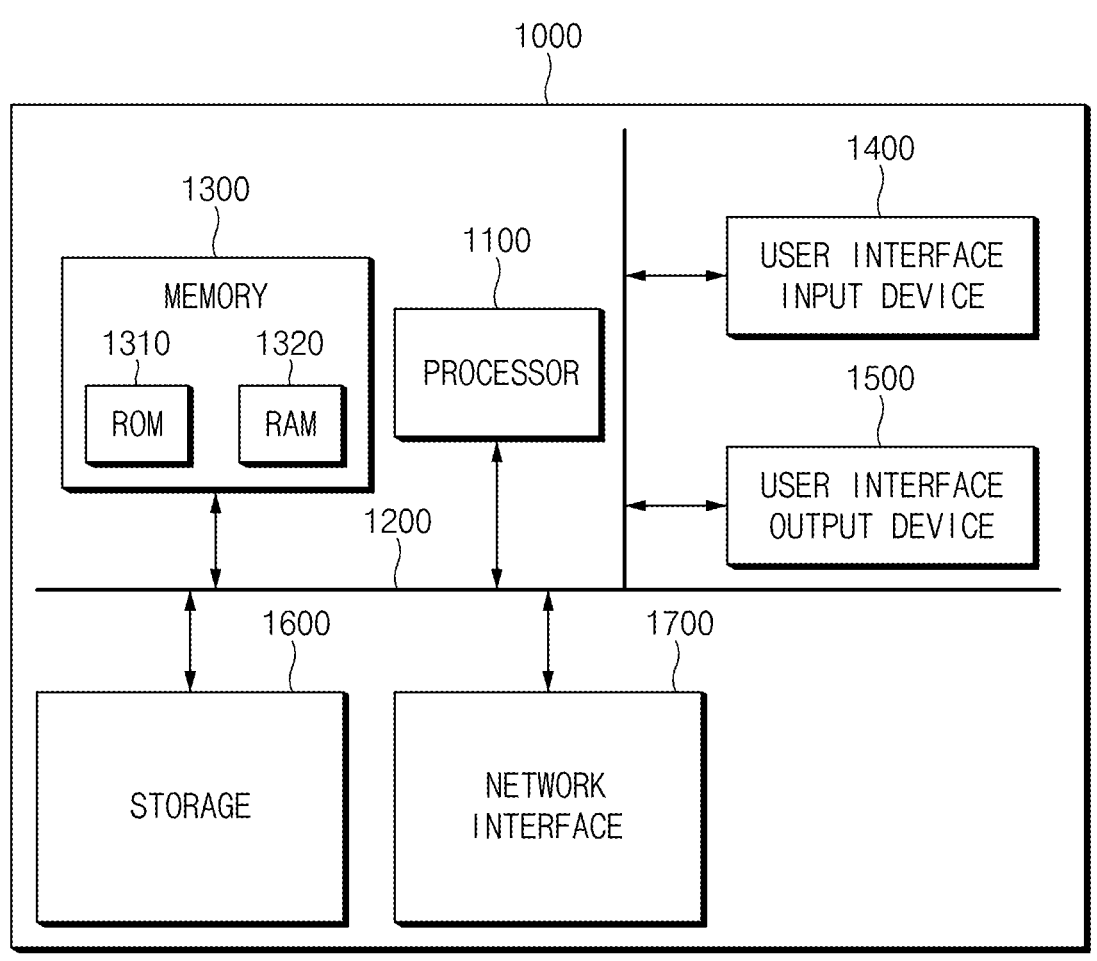
FIG. 9 is a block diagram illustrating a computing system for executing a vehicle control method, according to an exemplary embodiment of the present disclosure.

FIG. 9 is a block diagram illustrating a computing system for executing a vehicle control method, according to an exemplary embodiment of the present disclosure.

Referring to FIG. 9, a method of determining fail-safe of camera image recognition according to an exemplary embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The processor 1100 may correspond to the processor 8 of FIG. 8.

The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to an exemplary embodiment of the present disclosure, the slope inclination of a road surface may be estimated.

According to an exemplary embodiment of the present disclosure, the shape of a line may be estimated.

According to an exemplary embodiment of the present disclosure, differences in a vehicle posture for each driving area of the vehicle may be matched with differences in a slope inclination of a road surface.

According to an exemplary embodiment of the present disclosure, the slope inclination of a road surface or the shape of a line may be estimated by photographing the same area of a road surface with a plurality of cameras at different times.

According to an exemplary embodiment of the present disclosure, geometric errors with respect to images generated by a camera may be corrected based on the slope inclination of a road surface.

According to an exemplary embodiment of the present disclosure, even when a vehicle is on a slope road, the distance between a vehicle and an object may be accurately measured using a camera.

According to an exemplary embodiment of the present disclosure, it is possible to estimate a slope inclination or the shape of a line without additional hardware.

The effects which may be obtained from the present disclosure are not limited to the effects mentioned above, and other effects not described herein may be more clearly understood from the above detailed description by persons skilled in the art.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a vehicle, the method comprising:
estimating, by an estimator, a first slope inclination of a first area by photographing the first area using a first camera in a state that the vehicle is located in an area where an inclination of a vehicle floor is the same as a slope inclination of a road surface;
estimating, by the estimator, a second slope inclination of a second area by photographing the second area located farther from the vehicle than the first area using a second camera;
estimating, by the estimator, a third slope inclination of the second area by photographing the second area using the first camera in a state that the vehicle is driven and located in the first area;
estimating, by the estimator, a final slope inclination of the second area or a line shape of the second area based on a comparison result between the second slope inclination and the third slope inclination; and
controlling, by a controller, the vehicle based on road surface information including at least a part of the first slope inclination, the final slope inclination of the second area, and the line shape of the second area.

2. The method of claim 1, wherein the estimating of the first slope inclination of the first area includes:
detecting, by a detector, a first line of the first area;
detecting, by the detector, a first vanishing point based on the first line;
estimating, by the estimator, a first vehicle posture based on the first vanishing point; and
estimating, by the estimator, the first slope inclination based on the first vehicle posture.

3. The method of claim 2, wherein the estimating of the first slope inclination of the first area includes:
estimating, by the estimator, the first slope inclination by matching a pitch angle of the first vehicle posture to the first slope inclination.

4. The method of claim 2, wherein the estimating of the second slope inclination of the second area includes:
detecting, by the detector, a second line of the second area;
detecting, by the detector, a second vanishing point based on the second line;
estimating, by the estimator, a second vehicle posture based on the second vanishing point; and
estimating, by the estimator, the second slope inclination based on the first vehicle posture, the second vehicle posture, and the first slope inclination.

5. The method of claim 4, wherein the estimating of the second slope inclination of the second area includes:
estimating, by the estimator, the second slope inclination by matching a difference between a pitch angle of the first vehicle posture and a pitch angle of the second vehicle posture to a difference between the first slope inclination and the second slope inclination.

6. The method of claim 1, wherein the estimating of the final slope inclination of the second area or the line shape of the second area includes:
estimating, by the estimator, the second slope inclination as the final slope inclination in a state that the second slope inclination is the same as the third slope inclination, and estimating, by the estimator, the first slope inclination as the final slope inclination in a state that the second slope inclination is different from the third slope inclination.

7. The method of claim 1, wherein the estimating of the final slope inclination of the second area or the line shape of the second area further includes:
estimating, by the estimator, that lines in the second area are not in parallel to each other in a state that the second slope inclination is different from the third slope inclination.

8. The method of claim 7, wherein the estimating of the final slope inclination of the second area or the line shape of the second area further includes:
estimating, by the estimator, a degree of widening of the lines in the second area based on a difference between the second slope inclination and the third slope inclination.

9. The method of claim 1, wherein the controlling of the vehicle includes:
controlling, by the controller, the vehicle by correcting geometric errors with respect to images from the first camera or the second camera based on the road surface information.

10. A vehicle control apparatus comprising:
a first camera;
a second camera;

a memory configured to store computer-executable instructions; and at least one or more processors configured to access the memory and execute the instructions, and wherein the at least one or more processors are configured to:

estimate a first slope inclination of a first area by photographing the first area using the first camera in a state that a vehicle is located in an area where an inclination of a vehicle floor is the same as a slope inclination of a road surface, estimate a second slope inclination of a second area by photographing the second area located farther from the vehicle than the first area using the second camera, estimate a third slope inclination of the second area by photographing the second area using the first camera in a state that the vehicle is driven and located in the first area, and estimate a final slope inclination of the second area or a line shape of the second area based on a comparison result between the second slope inclination and the third slope inclination, and control the vehicle based on road surface information including at least a part of the first slope inclination, the final slope inclination of the second area, and the line shape of the second area.

11. The vehicle control apparatus of claim 10, wherein the at least one or more processors are further configured to:

detect a first line of the first area and a first vanishing point based on the first line, and estimate a first vehicle posture based on the first vanishing point and the first slope inclination based on the first vehicle posture.

12. The vehicle control apparatus of claim 11, wherein the at least one or more processors are further configured to:

estimate the first slope inclination by matching a pitch angle of the first vehicle posture to the first slope inclination.

13. The vehicle control apparatus of claim 11, wherein the at least one or more processors are further configured to:

detect a second line of the second area and a second vanishing point based on the second line, and estimate a second vehicle posture based on the second vanishing point, and the second slope inclination based on the first vehicle posture, the second vehicle posture, and the first slope inclination.

14. The vehicle control apparatus of claim 13, wherein the at least one or more processors are further configured to:

estimate the second slope inclination by matching a difference between a pitch angle of the first vehicle posture and a pitch angle of the second vehicle posture to a difference between the first slope inclination and the second slope inclination.

15. The vehicle control apparatus of claim 10, wherein the at least one or more processors are further configured to:

estimate the second slope inclination as the final slope inclination in a state that the second slope inclination is the same as the third slope inclination, and estimate the first slope inclination as the final slope inclination in a state that the second slope inclination is different from the third slope inclination.

16. The vehicle control apparatus of claim 10, wherein the at least one processors are further configured to:

estimate that lines in the second area are not in parallel to each other in a state that the second slope inclination is different from the third slope inclination.

17. The vehicle control apparatus of claim 16, wherein the at least one processors are configured to:

estimate a degree of widening of the lines in the second area based on a difference between the second slope inclination and the third slope inclination.

18. The vehicle control apparatus of claim 10, wherein the at least one or more processors are further configured to:

control the vehicle by correcting geometric errors with respect to images from the first camera or the second camera based on the road surface information.

* * * * *